United States Patent [19]
Starodetko et al.

[11] Patent Number: 5,870,893
[45] Date of Patent: Feb. 16, 1999

[54] METHOD OF CARRYING OUT A CYCLE IN A PISTON INTERNAL COMBUSTION ENGINE AND A PISTON INTERNAL COMBUSTION ENGINE

[76] Inventors: Evgeny Alexandrovich Starodetko; Georgy Evgenievich Starodetko; Konstantin Evgenievich Starodetko, all of Kulman Str. 15, app. 9, 220100 Minsk, Belarus; Simon Simand, 25 Canyon Avenue 1606, Northyork, Canada

[21] Appl. No.: 732,369
[22] PCT Filed: Feb. 9, 1995
[86] PCT No.: PCT/BY95/00001
  § 371 Date: Oct. 28, 1996
  § 102(e) Date: Oct. 28, 1996
[87] PCT Pub. No.: WO95/26465
  PCT Pub. Date: Oct. 5, 1995
[30] Foreign Application Priority Data
  Mar. 28, 1994 [BY] Belarus ................................. 01833-01
[51] Int. Cl.⁶ .................................................... F02B 37/00
[52] U.S. Cl. ............................................................ 60/605.1
[58] Field of Search .................................. 60/599, 605.1, 60/612; 123/562, 563

[56] References Cited

U.S. PATENT DOCUMENTS

| | | | |
|---|---|---|---|
| 1,593,571 | 7/1926 | Curtis | 60/605.1 |
| 3,257,797 | 6/1966 | Lieberherr | 60/599 |
| 3,712,280 | 1/1973 | Brille et al. | 560/599 |
| 4,211,082 | 7/1980 | Bristol | 60/605.1 |
| 4,633,671 | 1/1987 | Schatz | 60/605.1 |
| 5,076,248 | 12/1991 | Schatz | 60/599 |

FOREIGN PATENT DOCUMENTS

| | | | |
|---|---|---|---|
| 781987 | 3/1935 | France | 60/605.1 |
| 638923 | 6/1950 | United Kingdom | 60/605.1 |
| 815494 | 6/1959 | United Kingdom | 60/605.1 |

*Primary Examiner*—Michael Koczo
*Attorney, Agent, or Firm*—McAulay Nissen Goldberg Kiel & Hand, LLP

[57] ABSTRACT

This invention relates to internal combustion engines (ICE) and concerns the problem of increasing the effective use of fuel in them. The piston ICE includes a housing with installed cylinders 1, pistons 2 and the air-fuel mixture preparation system which includes two-stage thermodynamic energy exchanger 5 with cooler 6, installed between the stages of the exchanger 5, and the outlet of the second stage is connected with heat-insulated receiver 7 whereas this receiver is connected with engine cylinders by means of the valves 8. The combustion chamber 9 may be installed between the receiver 7 and the cylinder 1. In order to reduce the losses the hot gas expansion is accomplished at first in engine cylinder 1 to obtain the highest possible useful work, and then in thermodynamic energy exchanger 5, in which the air is compressed to achieve the parameters of fuel combustion beginning, after that the compressed air is stored in the receiver 7 while keeping the air parameters and is used for mixture preparation when it is necessary. The air is compressed in two stages: in first stage with cooling in the cooler 6 and then with heat loss prevention resulting from the heat insulation of the receiver 7.

10 Claims, 2 Drawing Sheets

METHOD OF CARRYING OUT A CYCLE IN A PISTON INTERNAL COMBUSTION ENGINE AND A PISTON INTERNAL COMBUSTION ENGINE

TECHNICS DOMAIN

The invention relates to energy-transforming plants, namely relates to piston internal combustion engines (ICE), in which the energy of cylinder exhausted gases is used to compress fresh charges of air.

BACKGROUND

The analysis of ICE shows that the parameters of its working process are not sufficiently high. In particular, they are 10–20 times lower than the parameters of steam engines. The maximum pressures of working substance for ICE and steam engine are comparative, but the mean effective pressure related to the working stroke equals about 10 kg/cm$^2$, and when related to volume displacement in a four-stroke working process equals only 2.5 kg/cm$^2$. For a steam engine this characteristic reaches 50 kg/cm$^2$.

The second substantial drawback of ICE is the incompatibility of the initial and final parameters of working substance. If at the beginning of compression, the pressure is equal 1 kg/cm$^2$ and the temperature is equal 300K, then at the end of the process, i.e. during the discharge of exhaust gases in atmosphere, the pressure reaches 6 kg/cm$^2$ and the temperature 1700K. When having such parameters there are great output losses of energy, substantial environment pollution and a complicated problem to silence exhaust noise of the engine operation.

The third essential drawback of ICE is the imperfection of the working substance compression process. It should be noted that the energy to compress a working substance is taken from the working gases, i.e. there is an exchange of thermodynamic energy between the working gases and the air being compressed before a combustion of fuel in it. The losses peculiar to ICE mechanism arise because of this energy exchange, and these losses are doubled because the mechanical energy obtained from the working gases travels from a piston bottom to a flywheel and then back.

The fourth drawback of majority of ICE is the discrepancy from an ideal compression process, which must proceed at first with intensive cooling and then at a second phase the adiabatically. Partly, the regulation of a heat transfer is realized by ceramic inserts, which insulate the cylinder walls and combustion chamber. Nevertheless, these inserts do not provide the intensive heat transfer at the first phase of a compression and improve only compression conditions at the second phase.

There are many various technical solutions in which the gases obtained as a result of air-fuel mixture combustion in ICE cylinder are used after their expansion in cylinders to increase the pressure of a fresh charge. For example, the invention according to author certificate of the USSR #1677358, 1989 "The method of the regulation of a diesel engine having turbo supercharge and the diesel engine" besides usage of exhaust gases in a supercharge turbo compressor plant, at partial load it uses such measures as to shut off the group of cylinders from the fuel supply, to change the scheme of the air-gas path by means of valves while shutting out the receiver and to use the shut off group of cylinders for the compressing of a fresh charge delivered to the operating group of cylinders.

This solution increases the efficiency of the engine when operating on partial regimes, but the exhaust losses reduce substantially the thermodynamic efficiency.

There are some technical solutions in which the thermodynamic processes in ICE are optimized, for example the solution described in author certificate N 1806282, 1989 "The method of four-stroke internal combustion engine operation with disconnectable cylinders" suggest to carry out the fresh charge compression twice, while after the first compression the air is cooled thus bringing the process nearer to isothermal process, and after the second compression the air is heated before delivery into operating cylinders.

Nevertheless, the improvement of the fresh charge compression process in this technical solution is carried out only for partial regimes, thus preventing to improve noticeably the efficiency of the fuel use, to obtain a principally new engine. Moreover, the air compression in the engine cylinder leads to increased mechanical losses.

The technical solutions, in which the thermodynamic processes for ICE exhausted gas energy transmission to air being compressed are used, are also known. For example, the author certificate of the USSR N 1134748, 1983 "Pressure exchanger" describes an apparatus, comprised of a drum having some passages with installed movable partitions which have from one side a connected exhaust gas collector and from the other side the delivery of fresh air. However, this technical solution does not allow all processes for fresh charge preparing and the parameters of compressed air which are necessary to begin combustion, thus reducing the efficiency of fuel energy usage.

Among known technical solutions "The method to realize a cycle of internal combustion piston engine" described in author certificated of the USSR #17060140, 1990, is considered by the authors as a prototype.

Taken as a prototype the method to realize a cycle of internal combustion piston engine consists in air compression, preparing of an air-fuel mixture, mixture combustion inside a cylinder with a movable piston, hot gas expansion and delivery of expansion work through a piston and an engine mechanism to an engine output shaft, while a portion of the gas energy is used to compress air.

This method provides comparatively high efficiency of energy transformation due to a preliminary compression of a fresh charge of air and due to the produced hot gas usage not only in the engine cylinder but in two-stage expansion machine.

However, the efficiency of a cycle in the method taken as a prototype is achieved due to the using of units which provide a mechanical transformation of energy (compressor and expansion machines) thus resulting in a low useful work factor and furthermore an additional compression of air in the engine cylinder results in losses of effective efficiency.

Among known piston internal combustion engines "The power unit" described in author certificate of the USSR #1835460, 1990, is taken by the authors as a prototype for their apparatus. Taken as a prototype the piston engine comprises a housing with cylinders, pistons joined to a power take off shaft by means of a mechanism and an air-fuel mixture preparation system which includes a device for air compressing which uses the energy of the cylinder exhaust gases; this engine contains valves and a cooler of compressed air also. This device contains the means which improve the effective usage of energy of engine cylinder exhaust gases: gases are delivered into a turbine which drives a super charge compressor and then into a steam generator which produces steam used for an additional increase of fresh charge pressure. As a prototype apparatus additionally to the above mentioned mechanical transformation losses there are great losses in the additional loop for the free-piston compressor working substance, and in a steam generator during the heat transfer process. The complicated construction of a prototype and its dimensions do not allow the creation of a power unit which can win a competition with known units, especially for vehicles.

The problem to be solved is maximal effective usage of the burned fuel energy. For this problem to be solved it is necessary:

to increase the mean effective pressure of working gases ICE cylinders in several times;

to reduce energy losses with exhaust gases and to attain gas parameters which are lower than critical ones thus probably allowing the elimination of a silencer, to attain a working process close to a Carnot cycle, i.e. to increase substantially the indicator efficiency;

to reduce as far as possible the losses when the expansion energy of the working gases is transformed into the energy of compressed air.

As a result of the solution of this problem a new technical result is achieved which includes the development of a principally new cycle of energy transformation in an internal combustion engine which achieves a substantially increased liter power and substantially reduced specific mass of an engine and its effective efficiency reaches to the value 0.85 which is the maximal possible in thermodynamic conversions. The piston internal combustion engine developed to realize this cycle becomes able to win a competition with the best engines among known ones and its usage in vehicles allows access to capacious market of automobiles.

BRIEF DESCRIPTION

The invention is based on the developed cycle of a piston internal combustion engine. The cycle consists of air compression, fresh air supply into a combustion chamber, fuel injection into the chamber, ignition of the fuel-air mixture, expansion of the working gases into a thermodynamic energy exchanger for air compression and the release of exhaust gases. The compressed air is stored inside a receiver for the preparation of an air-fuel mixture. Fuel is mixed only with compressed air and the mixture is ignited at a pressure of from 14 to 770 kgf/cm$^2$. Working gas expansion first takes place inside the engine cylinder up to 40% of the volume of the gas at atmospheric pressure, and is then carried out inside the thermodynamic energy exchanger where, at the expense of the remaining gas energy, air is compressed at a ratio of from 3 to 9 in a first stage, and from 3 to 24 in a second stage. Air accumulation is performed at the achieved parameters and the compressed air is supplied to the cylinder as needed by a control system command.

The piston internal combustion engine comprises at least one cylinder with a piston and a thermodynamic energy exchanger linked with the engine cylinder and connected to a receiver through a pressure line. The receiver is linked to the engine cylinder through an engine inlet valve.

According to the invention, the thermodynamic energy exchanger is designed as a two-stage free-piston compressor with one operating chamber connected to the engine cylinder through an inlet valve of the exchanger and to atmosphere through an outlet valve. Both valves are connected to the control system. The receiver is heat insulated. A valve for the supply of air to the engine cylinder is also connected to the control system. Furthermore, inlets and outlets of both air compression stages of the free-piston compressor are equipped with check valves. In another embodiment, a combustion chamber is installed between the receiver and the engine cylinder.

The distinguished feature of the method of operation is that air and fuel are mixed and ignited at a pressure of from 14 through 770 kgf/cm$^2$, the expansion of working gases first takes place inside the engine cylinder up to 40% of the volume of the gases at atmospheric pressure, and then is carried out inside the thermodynamic energy exchanger where air is compressed at a ratio of from 3 to 9 at the first stage, and from 3 to 24 at the second stage, the parameters for combustion air initiated, and air accumulation performed at the achieved parameters.

The two-stage air compression optimizes the process to make it close to an isothermal process in the first stage and to an adiabatic process in the second stage, thus achieving the pressure and temperature parameters for the compressed air which are necessary to begin fuel combustion with minimum energy expenditures. In this case, the most economical process is used to compress air since the energy exchange occurs in the thermodynamic exchanger where the losses are related only to losses occurred on the piston seal of the exchanger. Correspondingly, during expansion of the hot gases, a portion of the cycle work is expended inside the energy exchanger, and only useful work is transformed inside the engine cylinder into mechanical energy and transmitted to users through the engine mechanism According to the calculations of the cycle in a wide range of parameters, to achieve maximum useful work from the engine cylinder, hot gases should expand up to 40% of their volume at atmospheric pressure. The results of calculations for the claimed cycle in comparison with calculations for the engine with the same parameters (cylinder volume, suction conditions) working by the most efficient Otto cycle and using the same fuel (which defines the permissible adiabatic compression ratio) are shown in the following table. The octane number of the fuel which is used restricts the compression ratio inside the engine cylinder. As air compression according to the process cycle is carried out outside the cylinder, the parameters which could be obtained at the same adiabatic compression ratios are taken in order to compare this cycle with the Otto cycle.

The table contains: isothermal compression ratio $\epsilon_{is}$; adiabatic compression ratio $\epsilon_{ad}$; specific volume $V_R$ at the point R (see FIG. 2) which is equal to $V_c/V_{ch}$—the relation of engine cylinder volume to charge volume at normal conditions; maximum pressure $P_{max}$; pressure in exhaust outlet $P_{exh}$; effective (actual) efficiency $\eta_e$.

TABLE

| | The cycle in this invention | | | | | | Otto cycle | | | |
|---|---|---|---|---|---|---|---|---|---|---|
| | | | V = | | | | | | | |
| ## | $\epsilon_{is}$ | $\epsilon_{ad}$ | $V_c/V_{ch}$ | $P_{max}$ | $P_{exh}$ | $\eta_e$ | $\epsilon_{ad}$ | $P_{max}$ | $P_{exh}$ | $\eta_e$ |
| 1 | 2 | 2 | — | — | — | — | | | | |
| 2 | 3 | 3 | 0.395 | 13.95 | 3.58 | 0.325 | 3 | 20.14 | 5.10 | 0.149 |
| 3 | 4 | 3 | 0.360 | 18.62 | 3.42 | 0.375 | 3 | 20.14 | 5.10 | 0.149 |
| 4 | 4 | 4 | 0.285 | 27.86 | 3.05 | 0.440 | 4 | 29.00 | 5.12 | 0.184 |
| 5 | 5 | 5 | 0.209 | 47.59 | 2.65 | 0.512 | 5 | 38.00 | 5.08 | 0.210 |
| 6 | 5 | 8 | 0.127 | 91.90 | 2.23 | 0.582 | 8 | 65.60 | 4.88 | 0.258 |
| 7 | 8 | 5 | 0.160 | 76.15 | 2.30 | 0.560 | 5 | 38.00 | 5.08 | 0.210 |
| 8 | 6 | 6 | 0.157 | 73.72 | 2.35 | 0.559 | 6 | 47.07 | 5.01 | 0.229 |
| 9 | 6 | 8 | 0.113 | 110.3 | 2.11 | 0.597 | 8 | 65.60 | 4.88 | 0.258 |
| 10 | 8 | 6 | 0.131 | 98.29 | 2.15 | 0.584 | 6 | 47.07 | 5.01 | 0.229 |
| 11 | 7 | 7 | 0.120 | 106.7 | 2.12 | 0.593 | 7 | 56.30 | 4.95 | 0.245 |
| 12 | 7 | 8 | 0.103 | 128.7 | 2.01 | 0.608 | 8 | 65.60 | 4.88 | 0.258 |
| 13 | 8 | 7 | 0.110 | 122.0 | 2.03 | 0.602 | 7 | 56.30 | 4.95 | 0.245 |

TABLE-continued

The cycle in this invention

| | | | V = | | | Otto cycle | | | |
|---|---|---|---|---|---|---|---|---|---|
| ## | $\epsilon_{is}$ | $\epsilon_{ad}$ | $V_c/V_{ch}$ | $P_{max}$ | $P_{exh}$ | $\eta_e$ | $\epsilon_{ad}$ | $P_{max}$ | $P_{exh}$ | $\eta_e$ |
| 14 | 8 | 8 | 0.093 | 147.0 | 1.93 | 0.617 | 8 | 65.60 | 4.88 | 0.258 |
| 15 | 8 | 10 | 0.071 | 201.0 | 1.78 | 0.639 | 10 | 84.80 | 4.77 | 0.278 |
| 16 | 10 | 8 | 0.079 | 184.0 | 1.79 | 0.630 | 8 | 65.60 | 4.88 | 0.258 |
| 17 | 9 | 9 | 0.074 | 195.0 | 1.78 | 0.636 | 9 | 75.19 | 4.82 | 0.268 |
| 18 | 10 | 10 | 0.060 | 251.0 | 1.65 | 0.650 | 10 | 84.80 | 4.77 | 0.278 |
| 19 | 11 | 11 | 0.049 | 316.0 | 1.54 | 0.661 | 11 | 94.52 | 4.72 | 0.286 |
| 20 | 12 | 8 | 0.069 | 221.0 | 1.68 | 0.639 | 8 | 65.60 | 4.88 | 0.258 |
| 21 | 8 | 12 | 0.056 | 259.0 | 1.67 | 0.655 | 12 | 104.4 | 4.67 | 0.293 |
| 22 | 12 | 12 | 0.041 | 389.0 | 1.45 | 0.670 | 12 | 104.4 | 4.67 | 0.293 |
| 23 | 15 | 15 | 0.025 | 665.0 | 1.24 | 0.689 | — | — | — | — |
| 24 | 16 | 16 | 0.021 | 776.0 | 1.18 | 0.693 | — | — | — | — |
| 25 | 9 | 24 | 0.027 | 770.0 | 1.20 | 0.700 | — | — | — | — |

As is apparent from the table, the isobaric heat supply is not performed in the claimed cycle when the compression ratio is below 2*2=4 (the point R lies above $P_{max}$), but this compression ratio is not of interest for piston engines. A compression ratio above 12 is not considered for an Otto cycle because a fuel to be used in this case is not known. There are no restrictions for a compression ratio in the claimed cycle and it is very essential when an engine operates with rarefaction in suction, for example as for an aviation engine.

The volume of the engine cylinder which is used for fresh charge compression, fuel combustion and gas expansion is not greater than 40% of the volume of the engine cylinder. This substantially reduces the engine mass and mass related losses. In this case, only useful mechanical work is obtained and transmitted via the piston to a power take-off shaft. All energy expenditures for fresh air charge preparation are accomplished without using mechanisms due to thermodynamic energy converters, i.e. by means of most effective facilities among known ones.

The distinguished feature of the ICE is that the thermodynamic energy exchanger is made as a two-stage free-piston compressor with a working chamber connected to the engine cylinder through an inlet valve and to the atmosphere through an outlet valve of the pressure exchanger. Both valves as wells as the valve for the air supply for the engine cylinder are linked to the control system. The receiver is heat insulated. Furthermore, inlets and outlets of both air compression stages of the free-piston compressor are equipped with check valves.

The thermodynamic energy exchanger, being a free-piston compressor, achieves the most complete expansion of hot gases (in the case of sufficiently long exchanger, the expansion can be up to atmosphere parameters, i.e. it is possible to achieve "cold" exhaust). The cooler between the stages and the heat insulation of the second stage receiver allow the fresh charge compression process to be performed by means of a thermodynamically optimal method: first isothermally and then adiabatically. As a result, the receiver accumulates a fresh air charge, and this charge, according to its parameters, is ready for fuel burning by means of a valve both in the cylinder immediately and in an intermediate combustion chamber. This offers a wide variety of possibilities for engine power regulation and excludes unproductive losses, which reduce effective efficiency of known engines. Modern ICEs use only ⅓ of the fuel of an automobile tank to produce useful power, and the rest of the fuel is converted to heat losses (see Julius Mackerle "Automobils Lepsi Ucinnosti" Praha, 1985, SNTL-Nakladatelstvi Technike Literature, p. 13).

Furthermore, even for the exchanger dimensions which are restricted by the prototype displacement (see parameter $P_{exh}$ in the table), a prolonged gas expansion in the energy exchanger obtains, at optimal compression ratios ($\epsilon_{ad}=9$), a gas exhaust pressure, which is below critical ($P_{cr}=1,86$), thus eliminating exhaust noise and avoiding the use of a silencer. Therefore, the above-mentioned distinguished features of the claimed invention, compared to a prototype provide substantially effective usage of burned fuel energy.

BRIEF DESCRIPTION OF DRAWING

Referring to FIG. 1, the engine includes a housing with cylinders 1, pistons 2 joined by means of a crank mechanism 3 a power take off shaft 4, a system for air-fuel mixture preparation in which a two-stage thermodynamic energy exchanger 5 is used as a device for air compression, and a cooler 6 installed between stages of this exchanger.

An outlet of the second stage of energy exchanger 5 is joined to heat-insulated receiver 7 which is connected through a valve 8 with a cylinder 1 of the engine. FIG. 3 shows a variant in which a combustion chamber 9 with a valve 10 may be installed between the receiver 7 and the engine cylinder 1.

Figure 1:
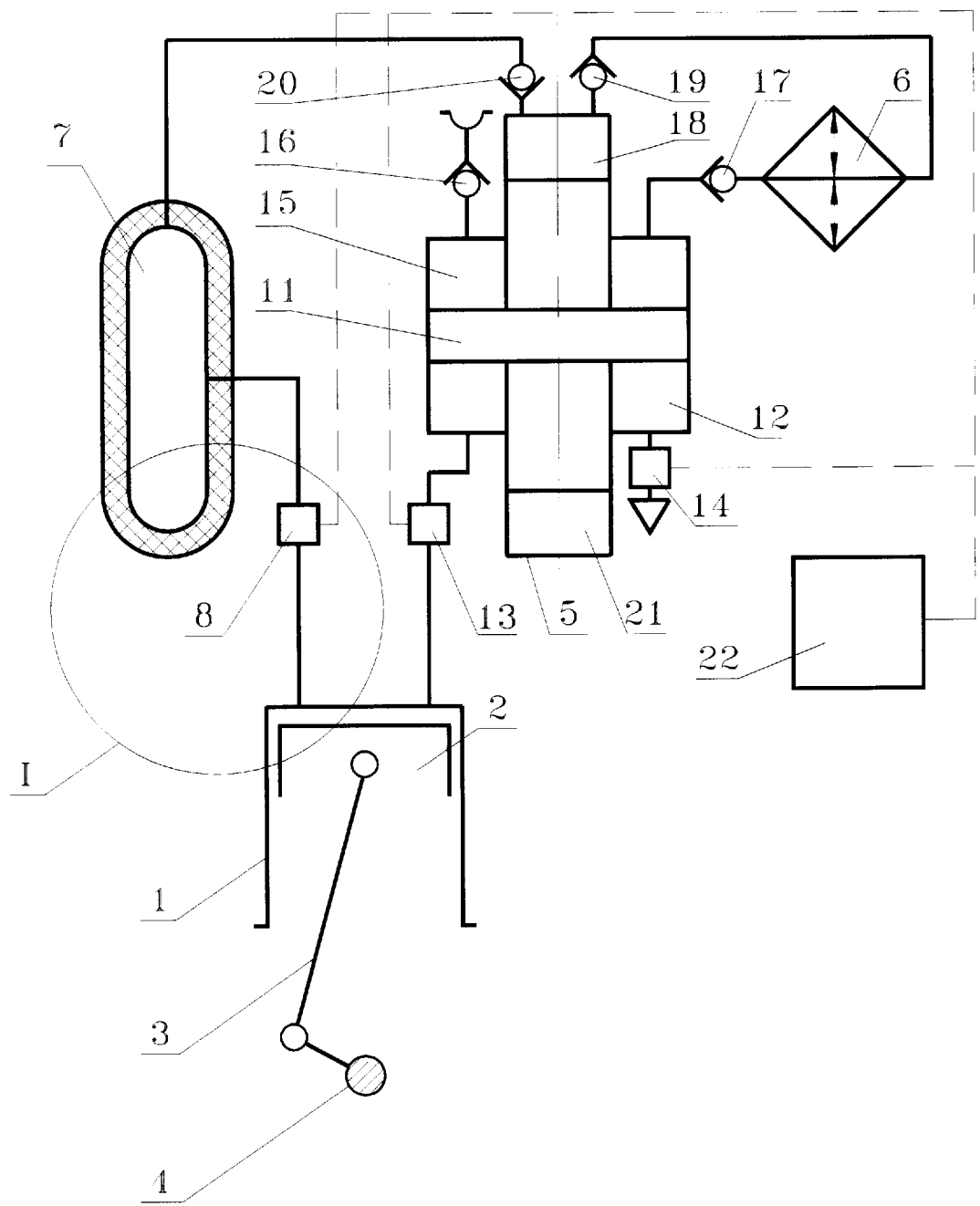
FIG. 1 is a principal scheme of a piston internal combustion engine which explains the method of a cycle realization according to the invention.

The thermodynamic energy exchanger 5 has a free piston 11 installed in a housing in which it creates the following cavities: a hot cavity 12 which is connected through a valve 13 with a cylinder 1 and through a valve 14—with a discharge port; first stage air compression cavity 15 which is connected through a valve 16 with a fresh air inlet and through a valve 17—with an inlet of the cooler 6; second stage air compression cavity 18 which is connected through a valve 19 with an outlet of the cooler 6 and through a valve 20—with the receiver 7; and a damping cavity 21. Engine valves: 16, 17, 19, 20,—have a direct action, for example check valves of tag type, and valves 8, 10, 13, 14 are controlled by a control system 22.

The cycle of the piston internal combustion engine is realized in the following way.

The cycle is based on the separation of the compressing process from the working chamber of the ICE and its complete realization by means of the thermodynamic energy exchanger 5. In this situation the energy exchanger 5 operates in a dynamic made in which a piston 11 under the action of hot gas pressure in the cavity 12 speeds up and then moves inertially thus allowing hot gases to give their energy for air compression in cavities 15 and 18 even in conditions in which a compression resistance exceeds hot gas pressure.

An operation of thermodynamic energy exchanger schematically shown in FIG. 1 is divided into two phases. In the first phase a force of hot gas pressure in a cavity 12 overcomes a force created by a pressure of air being compressed in cavities 15 and 18. The excess force causes an accelerated motion of the piston 11 and piston kinetic energy increases. After an equalizing of forces the second phase takes place. During this phase kinetic energy accumulated by the piston is transformed into the energy of the compressed air. In this process internal energy of hot gases continues to transform into energy of compressed air. The energy exchange is completed when the piston 11 stops. The reverse exchange is prevented by valves 17 and 20, which close the cavities of the receiver 7 and cooler 6.

Figure 2:
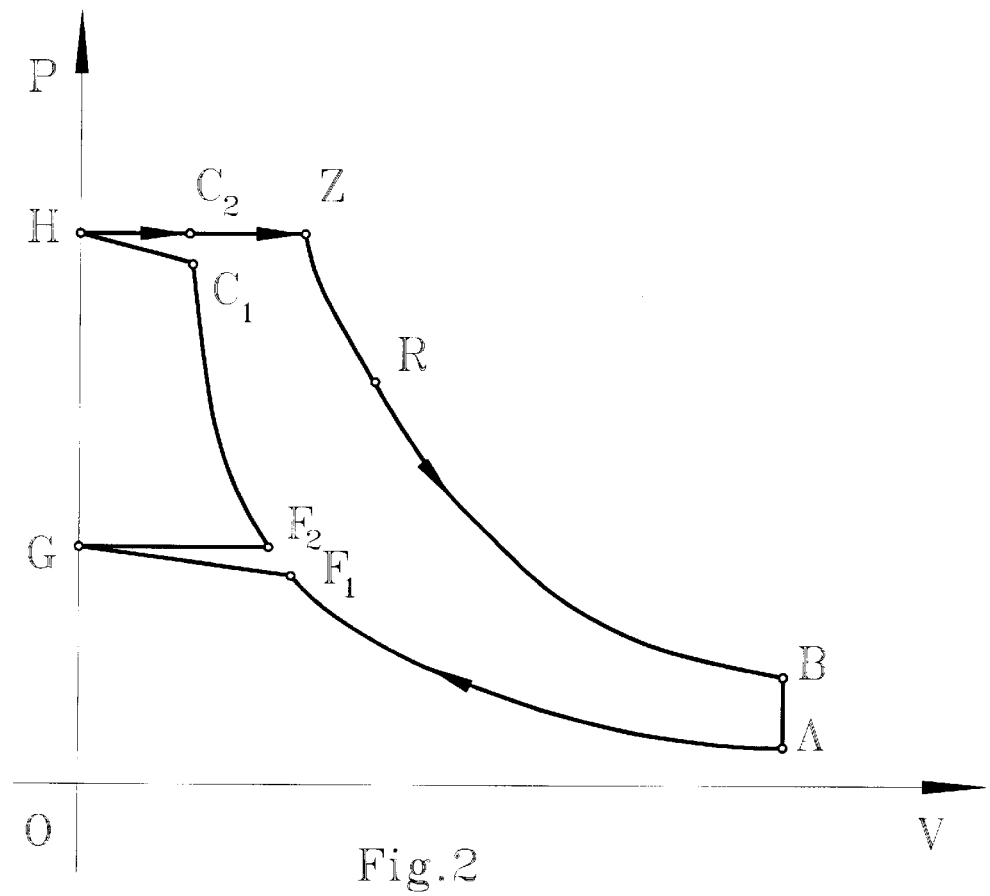
FIG. 2 is a PV—diagram which describes the thermodynamic processes being realized in a cycle.
Figure 3:
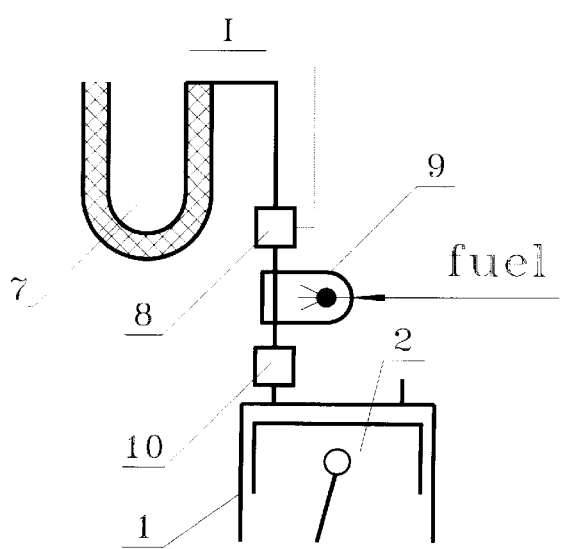
FIG. 3 represent a variant of the piston engine with an external combustion chamber.

The kinetic energy of the piston 11 allows enough complete expansion of the gases in a cavity 12 until an atmospheric pressure is reached even under conditions when at the end of compression the pressure in the combustion chamber exceeds the working gas pressure. However the final pressure of compressed air in cavity 15 does exceed an initial pressure of the working gases. For further increasing of compressed air pressure it is possible to use two-stage compression as it is shown in FIG. 1. This scheme and two receivers (the volume of a cooler 6 serves as an intermediate receiver) give a possibility to realize air preparation for the ICE which operates according to working process having indicator diagram in FIG. 2. This diagram describes thermodynamic processes which take place in the ICE, thermodynamic energy exchanger and in the receivers.

The line $AF_1$ describes the process of isothermal compression in the cavity 15. When the pressure $P_G$ has been reached the air is delivered into a cooler 6. The line $F_1G$ describes the delivery of all compressed air into the cooler 6. When the second stage air compression cavity 18 is being filled, air flows from cold receiver (cooler 6) and gives back to an exchanger 5 the work which have been made to pump air from low pressure cavity 15 into a cooler 6. This process is described by orientated segment $GF_2$. After compression cavity 18 has been filled the adiabatic air compression takes place and air flows into heat-insulated receiver 7 (line $C_1H$).

If a dead space in expansion chamber of ICE is negligible then the point H can be taken as the beginning of ICE operation. When a chamber volume is changed from 0 to $V_{C2}$ air flows from receiver 7 into ICE. During this time ICE operates as a pneumatic motor. An isobaric heat supply occurs on a segment $C_2Z$ and begins at the point $C_2$. An adiabatic expansion begins at the point Z and comes to an end in initial point A for an ideal case.

The distinguished feature of the indicated diagram is the introducing of a point R which divides the adiabatic expansion process into two fractions: ZR and RB. The process RB is less intensive and it takes place in the thermodynamic energy exchanger 5.

Therefore, the described process is characterized by high parameters of working substance and by limited volume of ICE cylinder thus making this process closer to the working process of a steam engine. In principle, a diagram shown in FIG. 2 can be plotted when keeping the most important requirements of a Carnot cycle. The first requirement is the coincidence of initial and final points of the process. In order to satisfy this requirement the point 2 is determined by the quantity of supplied heat. For value $V_Z$ the adiabatic line should be plotted to pass through the point A and its intersection with the straight line $HC_2$ should be found. Its should be noted that it is necessary to provide a proper angle between lines $AF_1$ and AR for ideal coincidence of initial and final points. For this case the conditions for good air cooling at the first stage of compression should be created and all the measures should be taken to prevent heat removal from ICE cylinders and exchanger 5 to walls of the expansion chamber when working substance expansion takes place.

The engine operates in two-stroke mode. At an initial moment of time all valves are closed, a piston of ICE is in top dead point (TDP) position, a piston of an exchanger 5 is in bottom dead point (BDP, i.e. in such position where a volume of a hot cavity 12 is minimal and volumes of first stage air compression cavity 15 and second stage air compression cavity 18 are maximal. When ICE piston moves from TDP an inlet valve 8 begins to open (we consider now a case when a combustion chamber 9 and a valve 10 are absent and fuel is injected directly to cylinder head as it is provided in known two-stroke ICE) and previously accumulated compressed air from receiver 7 flows into cylinder 1. At a proper displacement of a piston 2 from TDP position defined by a volume of the combustion chamber valve 8 is being closed and simultaneously fuel injection and fuel combustion take place thus producing working substance and working stroke. When piston 2 is in BDP outlet valve 13 is being opened and working substance which have transmitted partially its energy to ICE flows to cavity 12 of thermodynamic energy exchanger 5 in which it transmits its residual energy to a piston 11 and forces this piston to move to TDP position. In this case the air is compressed simultaneously in the first stage cavity 15 and in the second stage cavity 18 of the thermodynamic energy exchanger. When piston 11 comes to TDP position a compressed air from first stage air compression cavity 15 is passed through a valve 17 into a cooler 6, and a compressed air from second stage air compression cavity 18 is passed through a valve 20 into receiver 7. When a piston 11 is in TDP valves 17 and 20 are closed and then valves 14, 19, 16 are being opened. When a valve 19 is opened the air from cooler 6 flows under pressure into cavity 18 of the second stage, acts on piston 11 and moves it from TDP to BDP position. In this case exhaust gases from hot cavity 12 flow through valve 14 into atmosphere and atmospheric air is sucked into first stage cavity 15. When piston 11 approaches BDP position valves 14 and 16 are closed. So the air is accumulated in cavity 15 under atmospheric pressure and the air in cavity 18 is accumulate under pressure which is equal to the pressure in cooler 6. When a piston 11 travels from TDP to BDP due to a pressure in cavity 18 it accelerates and a shock-absorber is intended to brake a piston in BDP position; this shock-absorber may be designed as damping cavity 21 or as an additional energy exchanger which compresses air and delivers it to the receiver. At this moment a piston 2 in ICE, when moving from BDP to TDP, ejects residual working substance which flows out into atmosphere through an opened valve 13 and an opened valve 14. When a piston 2 comes to TDP valves 13 and 14 are closed. The cycle is repeated then. The serviceability of a constructive scheme shown in FIG. 1 depends on a relation working substance formation rate to motion velocity of piston 2. If a piston motion velocity exceeds a combustion rate then this scheme is not operable at high ICE revolution rate. In order to eliminate this discrepancy the combustion chamber 9 and the valve 10 are introduced additionally, thus extending the working substance preparation time without any damage to the whole process.

Industrial applicability

Therefore, the invention opens new possibilities to increase both efficiency and specific power of ICE. In essence, the new procedure is to organize an operation of a cycle in ICE. This procedure is based on double expansion of working gases in the two piston machines: in the ICE and in the thermodynamic energy exchanger. The expansion of gases in ICE provides obtaining of useful mechanical work and the expansion in the thermodynamic energy exchanger provides utilization of residual energy into compressed air energy. This procedure provides not only the energy utilization and reduction of specific consumption of materials for ICE due to an increase of mean indicator pressure in the working cylinder but simplifies the organization of the two-stroke operation. The new method essentially differs from prolonged expansion first of all in that the additional expansion of working gases begins not in the point where working gas volume is equalized with initial volume of fresh air but substantially earlier. If a prolonged expansion is realized in a gas turbine, then the work of this turbine is used to compress air preliminary which is called a super charge. A super charge pressure is substantially lower than a pressure required at the beginning of fuel combustion process. So a super charge needs an additional compression of air in a working cylinder.

In the scheme being proposed the thermodynamic energy exchanger compresses gas until reaching a pressure sufficient to begin fuel combustion. According to the calculations a residual energy of exhaust gases of an engine, which operates in basic Otto cycle or in Diesel cycle, is not sufficient. A thermodynamic energy exchanger must begin its operation in the point R (see FIG. 2) located between points of expansion beginning and exhaust beginning at a basic cycle. In the point R the volume of the working cavity of the thermodynamic energy exchanger adds to a volume of the ICE and the expansion continues just in two volumes. At the end of a common expansion these two volumes are connected with the environment and the cylinder ventilation begins. This expansion of working gases is called separated expansion. The point R divides an expansion curve into two fractions. In a first fraction the mechanical work is produced, in a second fraction the energy of exhausted gases is transmitted to a fresh charge. The thermodynamic energy exchanger is a thermodynamic converter having a minimal mechanical losses. Modern engineering allows the use of known pistons having gas seals. In this case a mechanical efficiency should be not less than 99%. The basic mechanical losses of a claimed system are produced mainly during piston power stroke.

The engine has great advantages compared with known engines in energetic performance, in mass and in dimensions. When having a common compression ratio in energy exchanger $\epsilon=100$ (a first stage compression ratio $\epsilon_{is}=10$, and a second state ratio $\epsilon_{ad}=10$) the outlet gas temperature does not exceed 200° C. (473K) and the volume of a net engine (and its corresponding mass) is 15 times less than the engine net volume. Because the engine mechanical losses are defined by a mass of its parts, these losses are reduced compared with known ICE proportionally in the same amount.

It should be also noted that the presence of a compressed air intermediate cooling in the engine allows a reduction in the octane number of a fuel to be used.

As it is follows from a scheme in FIG. 1, the system operated with two-stage air compression has 7 (or 8 in case of additional combustion chamber) valves. Four valves are used in a compression part of the system and can be made as free controllable, for example tag type valves. The rest of the valves should have dependent control. The main task of a system which controls the operation of these valves is the synchronization of the ICE with the thermodynamic energy exchanger. This task becomes more complicated because the pistons of the ICE and the thermodynamic energy exchanger have no mechanical coupling and can move with different velocities. In view of this situation the control of the valves should provide both the control of the ICE work and the matching of the ICE with the thermodynamic energy exchanger.

We claim:

1. A piston internal combustion engine comprising
at least one cylinder having a piston reciprocally mounted therein;
a thermodynamic energy exchanger having a two stage free piston dividing said exchanger into at least a first cavity for receiving and expanding hot exhaust gas from said cylinder, a first stage air compression cavity opposite said first cavity for isothermal compression of air therein and a second stage air compression cavity opposite said first cavity for adiabatic compression of air therein;
an air cooler connected to said first stage air compression cavity to receive and cool compressed air therefrom, said cooler being connected to said second stage air compression cavity to deliver cooled air thereto for adiabatic compression therein; and
a heat insulated receiver connected to said second stage air compression cavity to receive compressed air therefrom, said receiver being connected to said cylinder to deliver compressed air thereto.

2. A piston internal combustion engine as set forth in claim 1 which further comprises a first control valve disposed between said cylinder and said first cavity of said energy exchanger for controlling a flow of hot exhaust gas from said cylinder to said first cavity; a second control valve connected with said first cavity to exhaust hot gas therefrom; a third control valve disposed between said receiver and said cylinder for controlling a flow of compressed air from said receiver to said cylinder; and a control system operatively connected to each said control valve for selectively opening and closing said valves.

3. A piston internal combustion engine as set forth in claim 2 which further comprises
a first check valve connected to said first stage air compression cavity to permit a flow of air into said first stage cavity;
a second check valve between said first stage air compression cavity and said cooler to allow a flow of compressed air from said exchanger to said cooler;
a third check valve between said cooler and said second stage air compression cavity to allow a flow of cooled air from said cooler to said second stage cavity; and
a fourth check valve between said second stage air compression cavity and said receiver to allow a flow of compressed air from said second stage cavity to said cooler.

4. A piston internal combustion engine as set forth in claim 2 which further comprises a combustion chamber disposed between said receiver and said cylinder for receiving a flow of compressed air from said receiver and for combusting a mixture of a fuel and the received air; a fourth control valve disposed between said combustion chamber and said cylinder for controlling a flow of combusted mixture from said combustion chamber to said cylinder, said control system being operatively connected to said fourth control valve for selectively opening and closing said fourth valve.

5. A method of operating a piston internal combustion engine having at least one cylinder and a reciprocating first piston therein; said method comprising the steps of
moving the piston from a top dead center position in the cylinder toward a bottom dead center position therein while drawing in a flow of compressed air into the cylinder;
injecting fuel into the cylinder to form a fuel-air mixture;

combusting the mixture of compressed air and fuel in the cylinder to form a hot expanding gas and to drive the piston to the bottom dead center position;

metering a part of the hot expanding gas from the cylinder into a first cavity of a thermodynamic energy exchanger to move a second piston in said exchanger from a bottom dead center position towards a top dead center position to compress a charge of air in a first stage air compression cavity opposite the first cavity and to simultaneously compress a second charge of air in a second stage air compression cavity opposite the first cavity;

exhausting a flow of compressed air from the first cavity for delivery to the second during movement of the second piston towards the top dead center postion thereof;

cooling the compressed air from the first cavity prior to delivery to the second cavity;

exhausting a flow of compressed air from the second cavity during movement of the second piston towards the top dead center position thereof to a heat insulated receiver; and exhausting a flow of exhaust gas from the cylinder into the first cavity during movement of the first piston from the bottom dead center position thereof towards the top dead center position thereof;

exhausting the exhaust gas in the first cavity to atmosphere; and delivering a flow of compressed gas from the receiver to the cylinder during a second stroke of the first piston from the top dead center position thereof towards the bottom dead center position thereof.

6. A method as set forth in claim 5 wherein the mixture of compressed air and fuel is combusted at a pressure of from 14 to 770 kgf/cm$^2$.

7. A method as set forth in claim 6 wherein the hot expanding gas is expanded in the cylinder to a valve not greater than 40% of the total volume of the gas at atmospheric pressure prior to metering a part of the expanding gas to the first cavity.

8. A method as set forth in claim 7 wherein the air in the first stage cavity is compressed from 3 to 9 times and the air in the second stage cavity is compressed from 3 to 24 times.

9. A method as set forth in claim 5 wherein the hot expanding gas is expanded in the cylinder to a value not greater than 40% of the total volume of the gas at atmospheric pressure prior to metering a part of the expanding gas to the first cavity.

10. A method as set forth in claim 5 wherein the air in the first stage cavity is compressed from 3 to 9 times and the air in the second stage cavity is compressed from 3 to 24 times.

\* \* \* \* \*

UNITED STATES PATENT AND TRADEMARK OFFICE
CERTIFICATE OF CORRECTION

PATENT NO. : 5,870,893
DATED : February 16, 1999
INVENTOR(S) : Evgeny Alexandrovich Starodetko, et al It is certified that error appears in the above-identified patent and that said Letters Patent is hereby corrected as shown below:

Column 1, line 45, change "phase the" to --phase--

Column 6, line 54, change "made" to --mode--

Column 8, line 1, after "BDP" insert --)--

Line 35, change "accumulate" to --accumulated--

Column 11, line 14, after "the second" insert --cavity--

Signed and Sealed this

First Day of June, 1999

Attest:

*Attesting Officer*

Q. TODD DICKINSON

*Acting Commissioner of Patents and Trademarks*